United States Patent

Ziebol

[11] Patent Number: 5,475,782
[45] Date of Patent: Dec. 12, 1995

[54] CRIMP FOR FIBER OPTIC CONNECTOR

[75] Inventor: Robert J. Ziebol, Blaine, Minn.

[73] Assignee: ADC Telecommununications, Inc., Minneapolis, Minn.

[21] Appl. No.: 243,462

[22] Filed: May 16, 1994

[51] Int. Cl.⁶ .................................................. G02B 6/36
[52] U.S. Cl. .............................................. 385/87; 385/69
[58] Field of Search ............................... 385/69, 86, 87

[56] References Cited

U.S. PATENT DOCUMENTS

| | | | |
|---|---|---|---|
| 4,576,437 | 3/1986 | Ohta et al. | 385/87 |
| 4,589,727 | 5/1986 | Williams | 385/136 |
| 5,140,662 | 8/1992 | Kumar | 385/87 |
| 5,142,602 | 8/1992 | Cabato et al. | 385/87 |
| 5,181,267 | 1/1993 | Gerace et al. | 385/86 |
| 5,202,942 | 4/1993 | Collins et al. | 385/87 |
| 5,222,169 | 6/1993 | Chang et al. | 385/87 |
| 5,224,187 | 6/1993 | Davisdon | 385/87 |

*Primary Examiner*—John D. Lee
*Attorney, Agent, or Firm*—Merchant, Gould, Smith, Edell, Welter & Schmidt

[57] ABSTRACT

A fiber optic cable is crimped to a fiber optic connector using a crimp sleeve having an insertion tube which is inserted between the optical fiber and reinforcement yarns of the cable. A flange projecting from the tube flares the yarn upon insertion of the tube into the cable. Subsequent insertion of the crimp sleeve and cable into a housing causes the flared yarn to fold back onto the cable avoiding contact of the yarn with adhesive in the connector.

9 Claims, 8 Drawing Sheets

CRIMP FOR FIBER OPTIC CONNECTOR

BACKGROUND OF THE INVENTION

1. Field of the Invention

This invention pertains to voice and data transmission over fiber optic cables. More particularly this invention pertains to an apparatus and method for crimping a fiber optic cable onto a connector.

2. Description of the Prior Art

Fiber optic connectors are well known for terminating a fiber optic cable. Commonly, the optical fiber of the cable is secured within a ferrule. The ferrule is contained within the housing of the connector. The cable is crimped to the housing. When crimping a cable to a fiber optic connector, it is desirable to crimp the cable in a manner which securely fastens the cable to the housing and avoids stresses on the fiber in the event disturbing forces are applied to the cable.

Terminations of optical fibers can be both factory made as well as performed in the field by technicians. Where the termination occurs in the field by technicians, is desirable that a crimp connection be easy to perform with a high degree of reliability. Further, fiber optic cables commonly include aramid yarn (e.g., Kevlar) which surrounds a fiber to provide reinforcement strength. From time to time, individual fibers of the aramid yarn can interfere with the termination of a cable on a connector. For example, when terminating a cable on a connector, an adhesive is commonly used to adhere the fiber to a ferrule. The reinforcement yarns may come in contact with the adhesive. This is undesirable.

It is an object of the present invention to provide a novel crimp for securing a fiber optic cable to a fiber optic connector. A further object of the invention is to provide such a crimp which securely attaches the cable to a fiber optic connector. A still further object of the invention is to provide such a crimp which avoids contact of aramid yarns with adhesive.

SUMMARY OF THE INVENTION

According to a preferred embodiment of the present invention, an apparatus and method are provided for crimping a fiber optic cable to a fiber optic connector. The fiber optic cable includes an optical fiber having a layer of reinforcement yarn fibers surrounding the optical fiber. A jacket surrounds the layer of yarn fibers. The connector includes a housing having an entrance opening. The method of the invention includes stripping a portion of the jacket from an end of the cable to expose a length of the optical fiber covered by an exposed length of the layer of reinforcement yarn fibers. The reinforcement yarn fibers are flared radially outwardly to expose an uncovered length of the optical fiber. The end of the cable is inserted into the housing through an entrance opening while folding the flared length of the layer of yarn fibers rearwardly onto the jacket. The folded length is at least partially inserted into the housing. The housing is crimped onto the end of the cable inserted into the housing.

DESCRIPTION OF THE PREFERRED EMBODIMENT

Referring now to the several drawing figures in which identical elements are numbered identically throughout, a description of the preferred embodiment of the present invention will now be provided.

Figure 1:
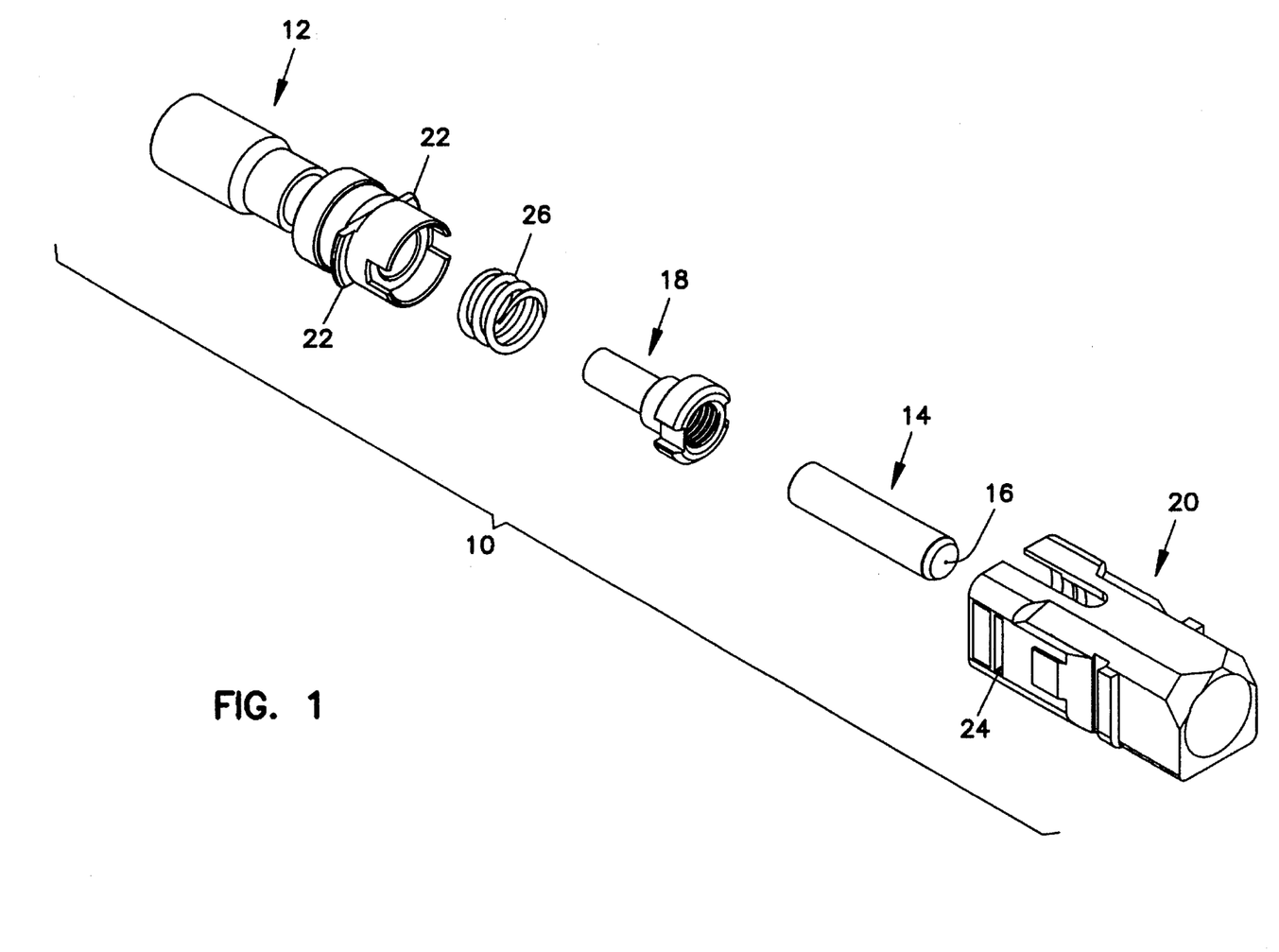
FIG. 1 is an exploded perspective view of a connector incorporating aspects of the present invention.
Figure 2:
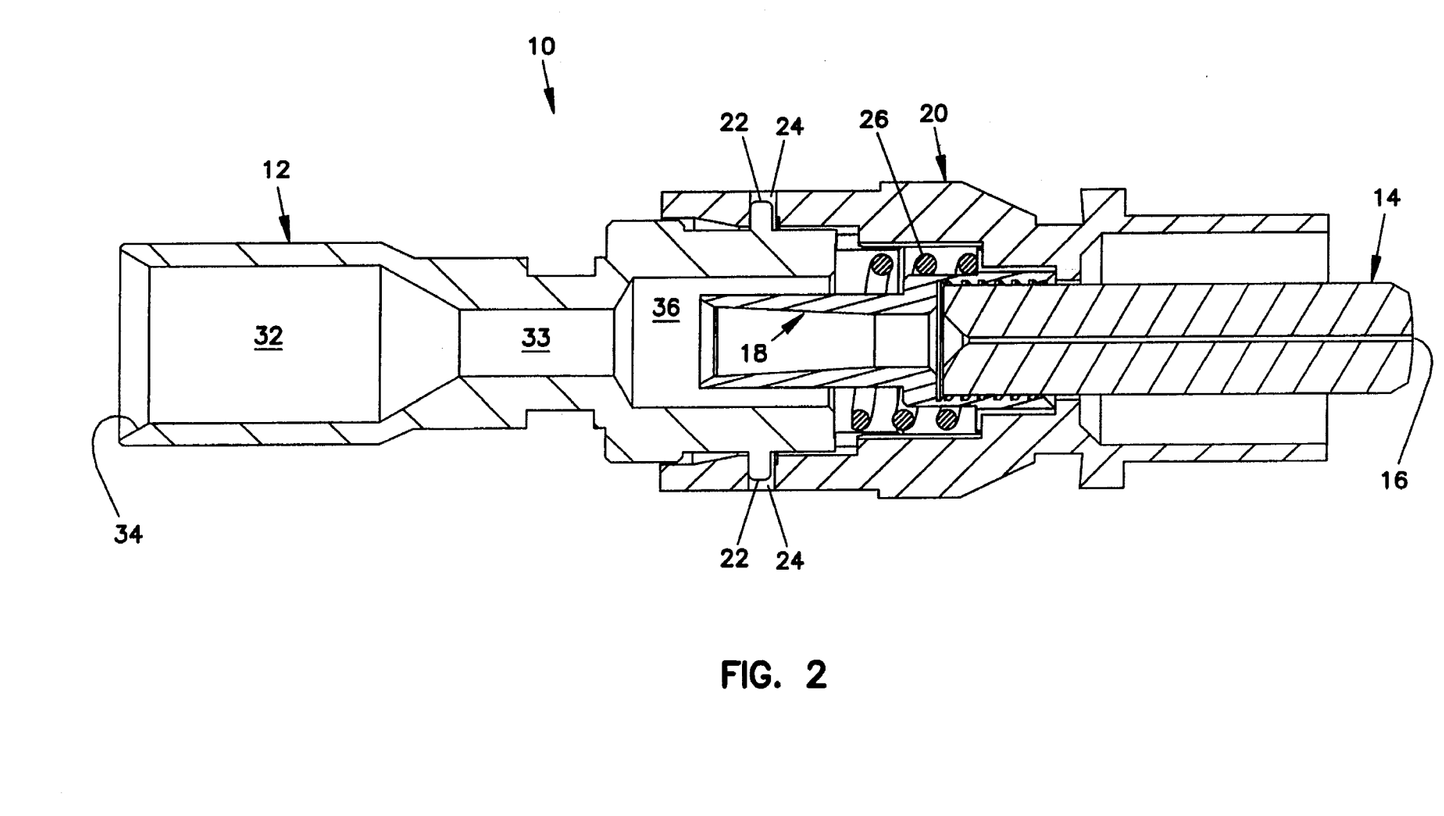
FIG. 2 is a side sectional view of the connector of FIG. 1.

With initial reference to FIGS. 1 and 2, a fiber optic connector 10 can according incorporating the present invention is shown. In the preferred embodiment illustrated in FIGS. 1 and 2, the connector 10 is a well known and so-called SC connector. It will be appreciated that the crimping apparatus and method of the present invention can be used in a wide variety of fiber optic connectors and need not be limited to use in an SC connector.

The connector 10 includes a crimp housing 12, a ferrule 14 having an axially extending bore 16 and a ferrule hub 18. The ferrule 14 is press fit or otherwise secured to the hub 18. A casing 20 is provided secured to the crimp housing 12 by means of tabs 22 received within slots 24 formed in the casing 20. A spring 26 is provided for biasing the assembly of the ferrule 14 and hub 18 outwardly from casing 20 and away from crimp housing 12. As is conventional in SC connectors, an outer casing (not shown) surrounds the inner casing 20. It will be appreciated that except for crimp housing 12, the connector 10 thus described is conventional and the various elements discussed above being described solely for the purpose of placing the present invention in context in the preferred embodiment.

Figure 6:
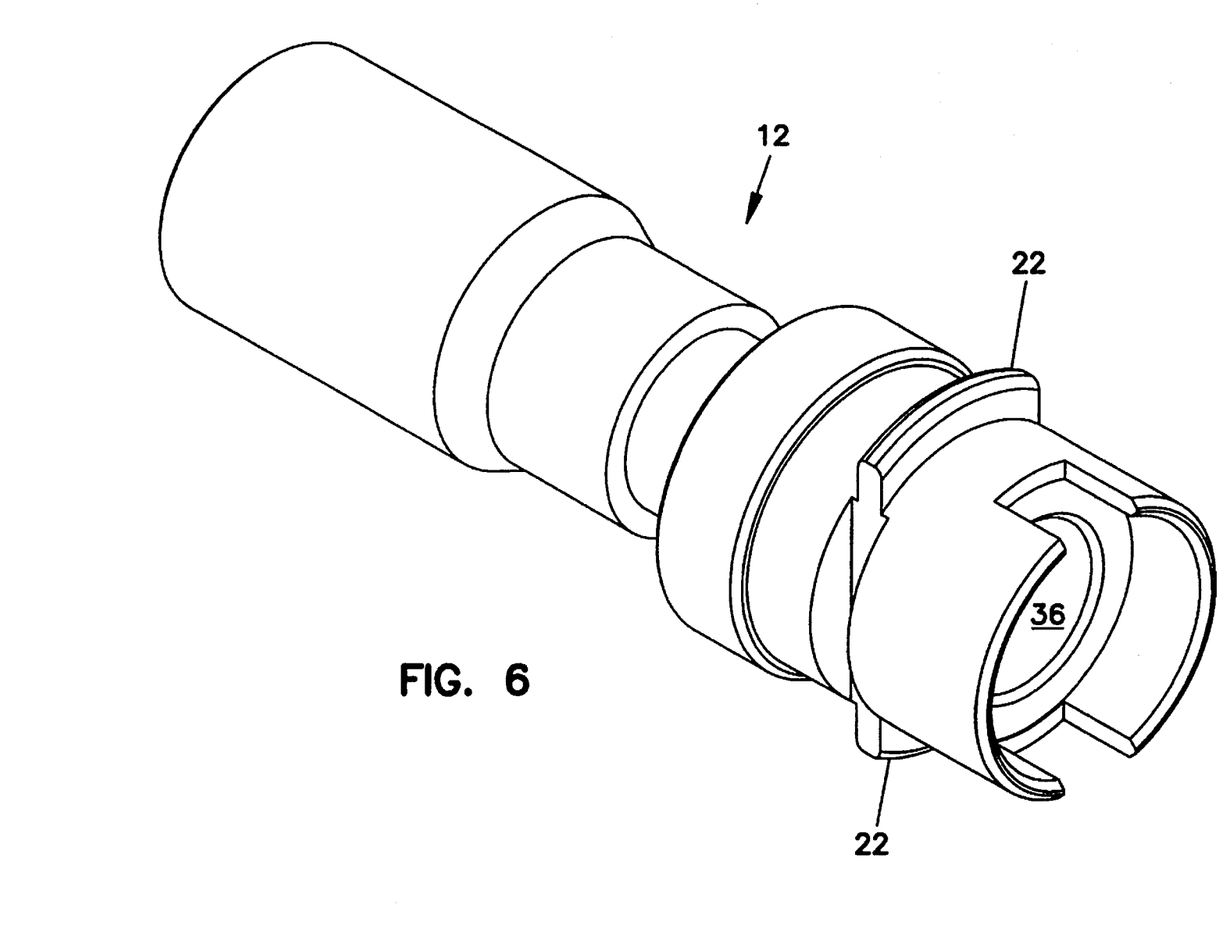
FIG. 6 is a perspective view of a housing for the crimp of the present invention.
Figure 7:
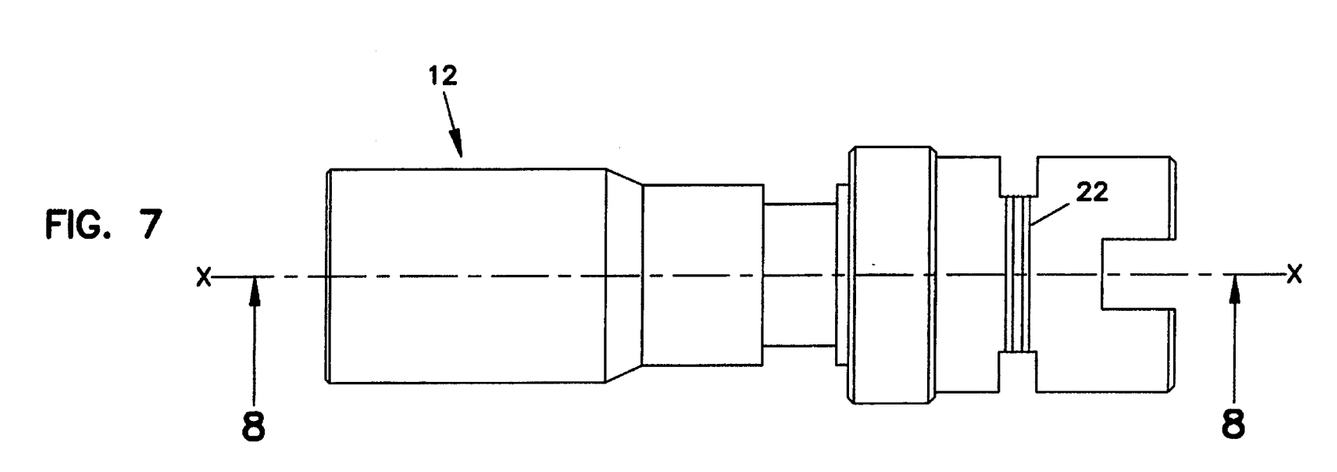
FIG. 7 is a side elevation view of the housing of FIG. 6.
Figure 8:
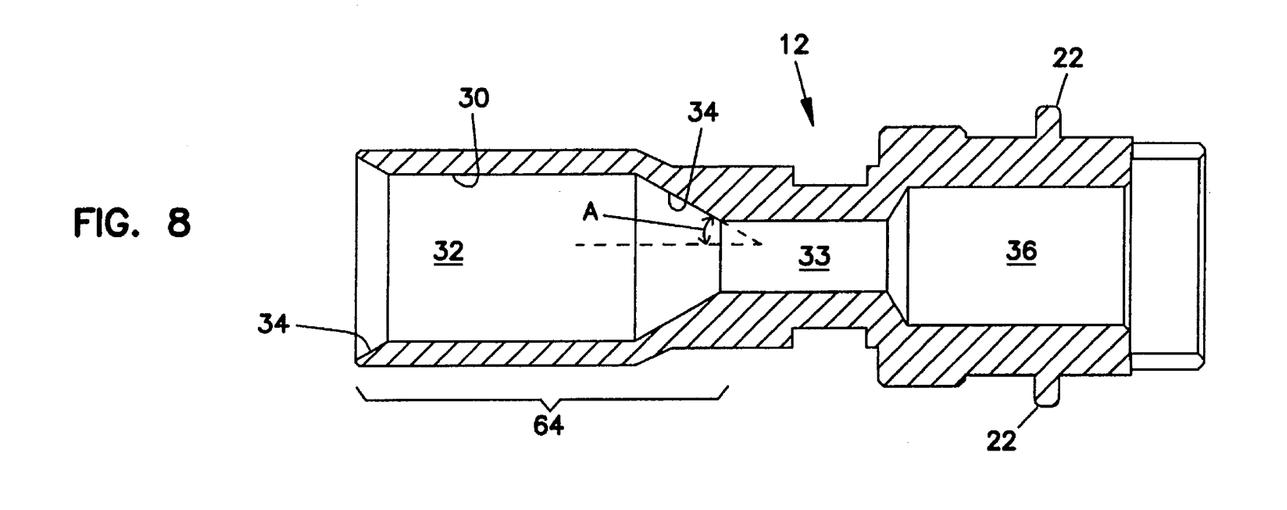
FIG. 8 is a view taken along line 8—8 of FIG. 7.

Crimp housing 12 is shown separately in FIGS. 6–8. The housing 12 is generally symmetrical along a longitudinal axis X—X. In a preferred embodiment, the housing 12 is formed of brass which can be crimped for purposes that will become apparent.

The housing 12 has internal surfaces 30 which define a chamber 32 (see FIG. 8). The chamber 32 is generally cylindrical and coaxial with axis X—X. The chamber 30 is exposed to the exterior of the crimp housing 12 through an entrance opening 34. An opposite end of the chamber 32 is frusto-conical in shape as indicated at 34.

The crimp housing 12 further includes a second chamber 36 in-line with chamber 32 and in communication therewith through a passage 33. Extending radially away from the housing 12 adjacent chamber 36 are tabs 22. The tabs 22 are received within the slots 24 of casing 20 as previously described with hub 18 axially received within chamber 36 (see FIG. 2). Chambers 32 and 36 are connected via a bore 38. In a preferred embodiment, the angle of frusto-conical portion 34 includes a lesser included angle A of 30° measured from axis X—X to the outer conical surface of portion 34.

Figure 3:
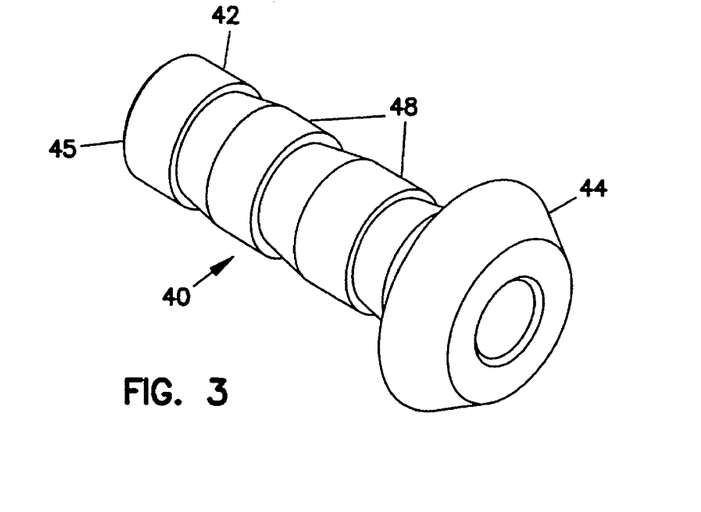
FIG. 3 is a perspective view of a crimp sleeve according to the present invention.
Figure 4:
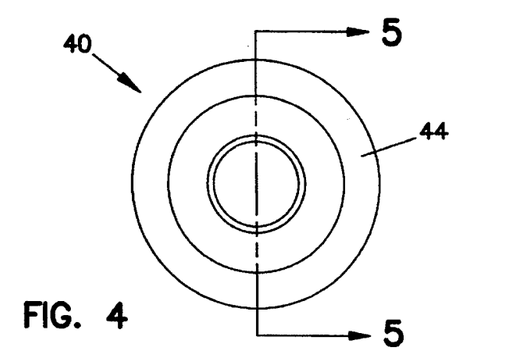
FIG. 4 is an end view of the sleeve of FIG. 3.
Figure 5:
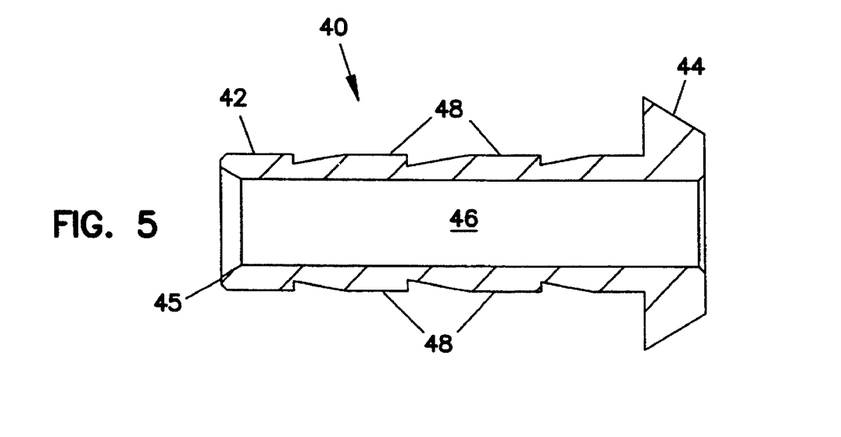
FIG. 5 is a view taken along line 5—5 of FIG. 4.

In FIGS. 3–5, a crimp sleeve 40 is separately shown. Sleeve 40 includes a hollow tube 42 having a flange 44 at one end of tube 42. Preferably, crimp sleeve 40 is formed of brass and has a bore 46 extending axially through tube 42. The bore 46 is sized to freely pass an optical fiber.

Figure 9:
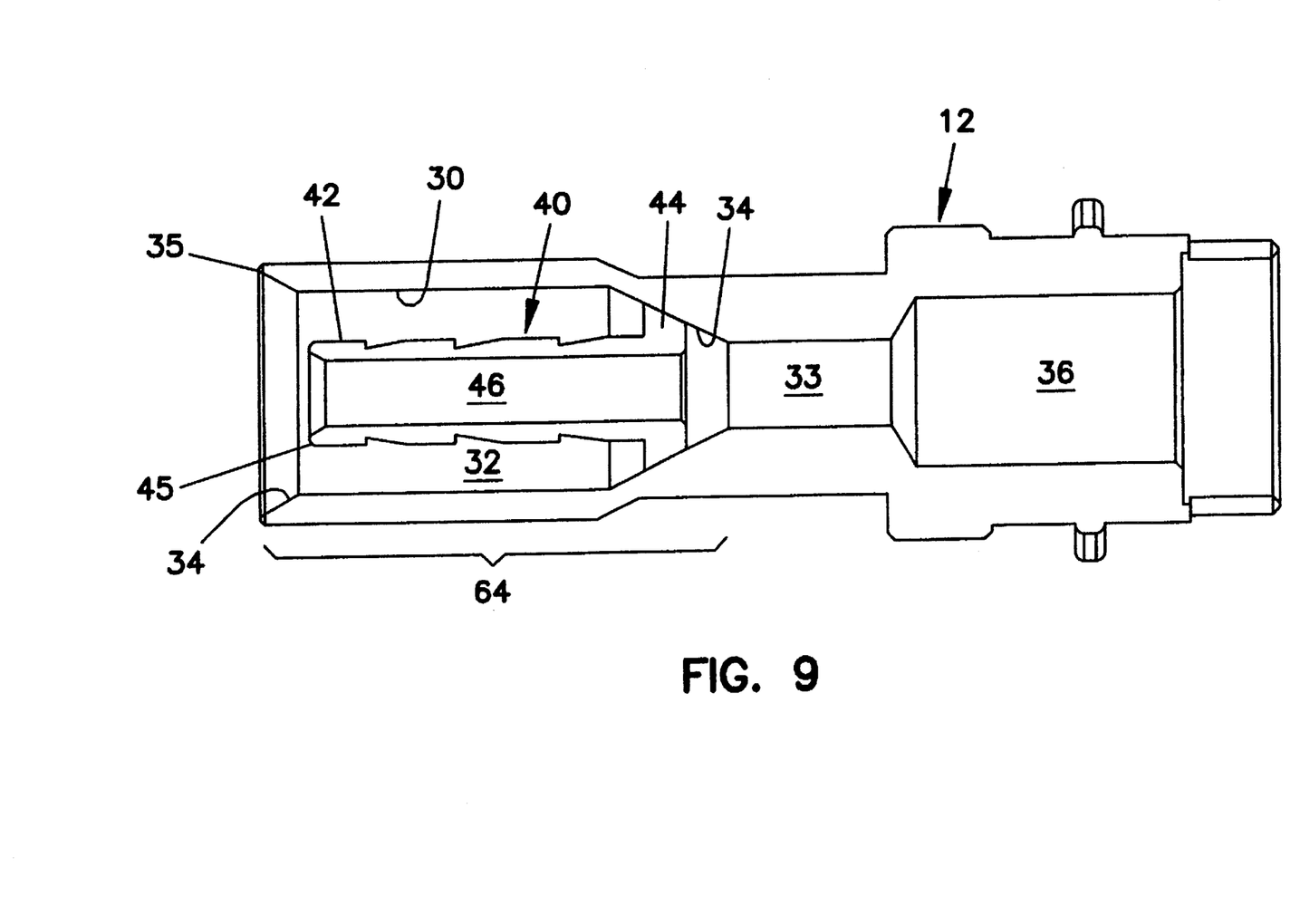
FIG. 9 is a cross-section assembled view of the housing of FIG. 6 and the crimped sleeve of FIG. 3.

The crimp sleeve 40 is sized to be received within chamber 32. The flange 44 is frusto-conical in shape and complementary to the shape of frusto-conical portion 34 of chamber 32. Accordingly, frusto-conical portion 34 acts as a stop for insertion of the sleeve 40 within chamber 32 as shown in FIG. 9. The outer cylindrical surface of tube 42 is provided with a plurality of raised areas 48 the function of which will be apparent.

Figure 10:
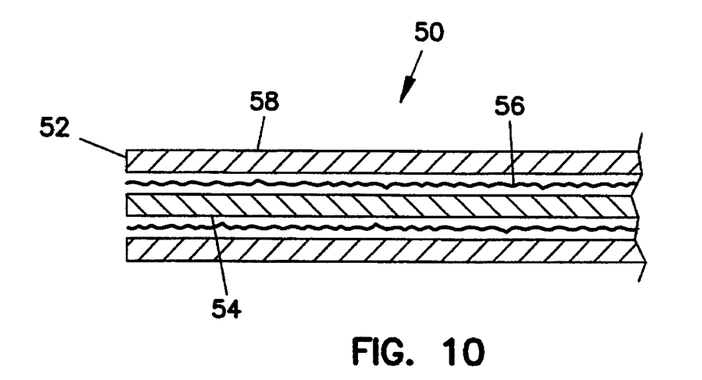
FIG. 10 is a schematic cross-sectional view of a fiber optic cable.

Crimp sleeve 40 and housing 12 cooperate to crimp an optical cable to SC connector 10. The crimping method and assembly is schematically shown in sequence in FIGS. 10–15. In FIG. 10, a fiber optic cable 50 is shown at a terminated end 52. The cable 50 includes an axially extending optical fiber 54 surrounded by a layer 56 of reinforcement yarn fibers such as aramid fibers (e.g., Kevlar). A jacket 58 surrounds layer 56. It will be appreciated that the construction of cable 50 as shown and described is conventional for optical fibers.

Figure 11:
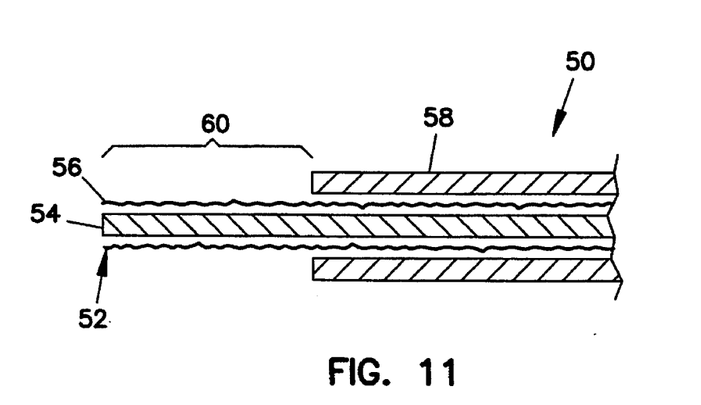
FIG. 11 is a view of the cable of FIG. 10 with a jacket of the cable partially stripped away.
Figure 12:
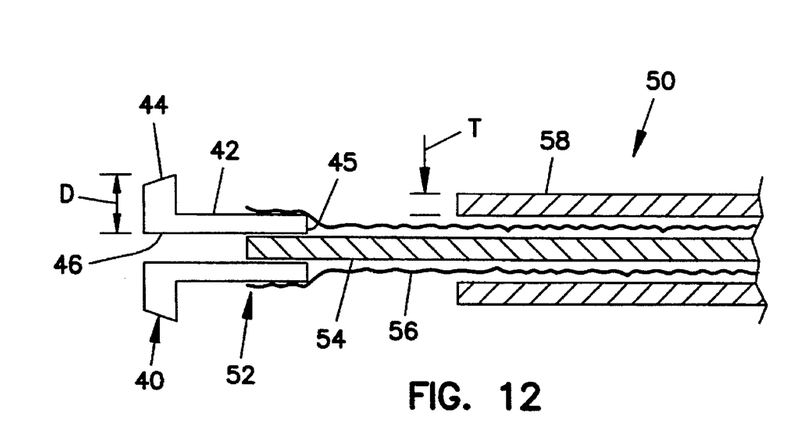
FIG. 12 is the view of FIG. 11 with a crimp sleeve of FIG. 3 in the process of being inserted onto the cable.

To crimp the cable 50, a portion of jacket 58 is stripped away from end 52 to expose a length 60 of optical fiber 54 surrounded and covered by an exposed length of layer 56 (see FIG. 11). An insertion end 45 of tube 42 opposite flange 44 is inserted within the end 52 of cable 50 with optical fiber 54 passing through bore 46 and with the tube 42 disposed between the fiber 54 and the layer 56. FIG. 12 shows the initial insertion of tube 42 into end 52.

Figure 13:
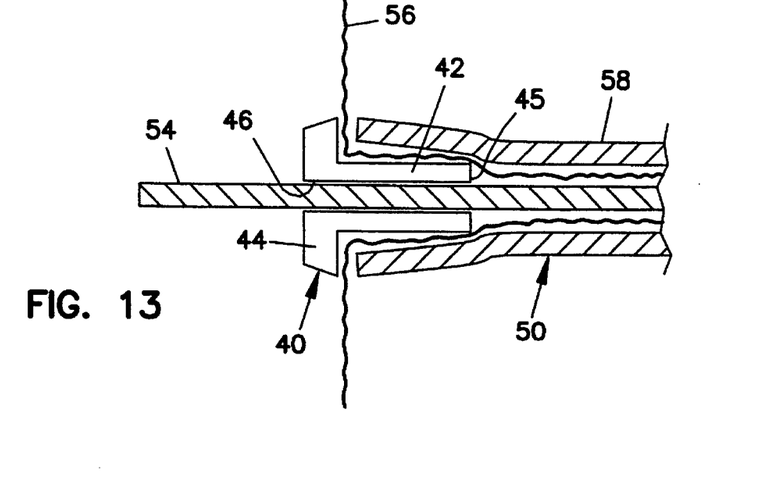
FIG. 13 is the view of FIG. 12 with the crimp sleeve fully inserted and with a yarn layer flared outwardly.

As the tube 42 is further inserted into end 52, the flange 44 abuts the yarn fibers of layer 56 causing the layer 56 to flare radially outwardly as shown in FIG. 13. The sleeve 40 is fully inserted until the progress of sleeve 40 is blocked by reason of the flange 44 abutting the free end of jacket 58 (with the flared yarn 56 disposed between the flange 44 and free end of the jacket 58). Preferably, the radial dimension D of the flange is sized to approximate a thickness T of the jacket 58. FIG. 13 shows the sleeve 40 fully inserted within the cable 50.

Figure 14:
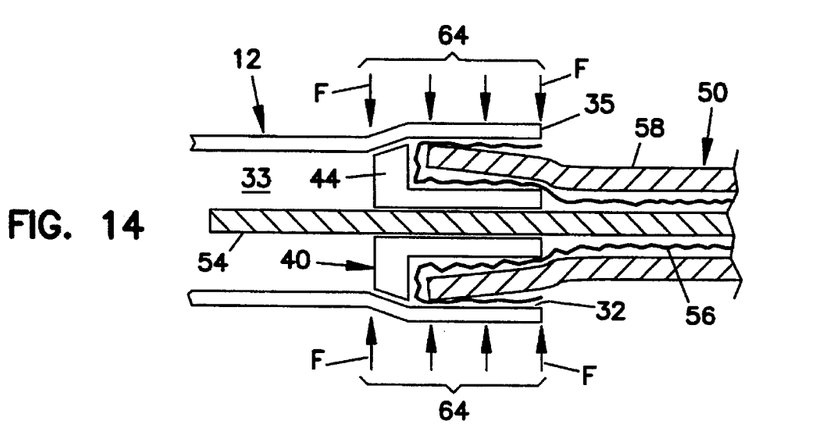
FIG. 14 is the view of FIG. 13 inserted within the housing of FIG. 6 and with the flared yarn layer folded onto the jacket of the cable and prior to crimping.

With the sleeve 40 fully inserted within the cable 50, the assembly of the sleeve and the cable is inserted through the entrance opening 34 into chamber 32 as shown in FIG. 14.

The act of insertion of the cable and sleeve 40 into chamber 32 causes the rear edge 35 (FIG. 14) of the housing to abut the flared yarn 56 causing the yarn to fold back over onto the exterior surface of the Jacket 58 as shown in FIG. 14. The assembly of the sleeve 40 and the cable 50 is fully received within a crimp region 64 of the housing 12. The crimp region 64 is the portion of the housing 12 extending from the frusto-conical portion 34 throughout the chamber portion 32. With the insertion as shown in FIG. 14, a crimping force (indicated by arrows F) is applied to the crimp portion 64 causing the crimp portion 64 to deform around the sleeve 40 and fiber cable 50 to securely capture the cable 50. The rigid tube 42 prevents the crimping force F from acting on and possibly damaging the optical fiber 54.

Figure 15:
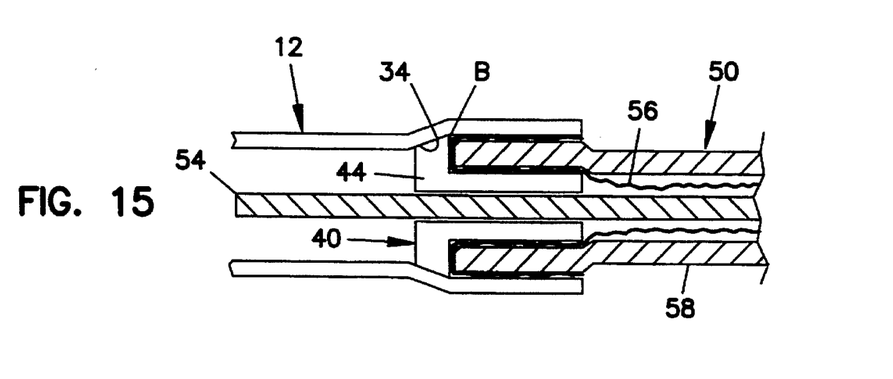
FIG. 15 is the view of FIG. 14 with the housing crimped onto the end of the cable.

As shown in the figures, the frusto-conical surface 34 of the housing 12 intersects with the radial surface of the flange 44 to provide a sharp point of intersection B which is an annular ring surrounding the flange 44. The crimping action causes the sharp intersection to bite into the material of the housing to securely fasten the crimp sleeve 40 to the housing 12 thereby preventing axial movement of the sleeve 40 within the housing 12. Also, the crimping force causes the material of the housing 12 to crimp onto both the jacket 58 and yarn layer 56. With reference to FIGS. 14 and 15, it will be noted that the yarn layer 56 being crimped includes that portion of the yarn layer on the interior of the jacket 58 and opposing tube 42 as well as that portion of the yarn layer 56 folded over and opposing the outer surface of the jacket 58. Also, the act of flaring out the yarn 56 (shown in FIG. 13) with the yarn 56 being folded back over upon insertion as shown in FIG. 14, prevents yarn from inadvertently migrating toward hub 18 (FIG. 2) which would otherwise result in the yarn 56 contacting adhesive used in fastening the ferrule 14 to the fiber 54.

With the foregoing invention, contact of the yarn 56 with adhesive is avoided. Also, the yarn 56 is evenly distributed around the crimp. The raised areas or barbs 48 (FIG. 5) on crimp sleeve 40 also provide a secure attachment of the yarn 56 in the crimp area 64 of the jacket to the sleeve 40.

From the foregoing detailed description of the present invention it has been shown how the objects of the invention has been achieved in a preferred manner. However, modifications and equivalents of the disclosed concepts such as those which readily occurred at one of skilled in the art are intended to be included within the scope of the claims which are appended thereto.

What is claimed is:

1. A crimp for securing a fiber optic cable to a fiber optic connector wherein said cable includes an axially extending optical fiber, a layer of reinforcement yarn fibers surrounding said optical fiber and a jacket surrounding said layer of yarn fibers; said crimp comprising:

(a) a crimp sleeve including:
 (i) an insertion tube having:
  (1) a bore extending axially therethrough and sized to pass said optical fiber;
  (2) an external dimension sized for said insertion tube to be inserted within an end of said cable with said optical fiber passing through said bore and with said tube disposed between said optical fiber and said layer of reinforcement yarn fibers;
 (ii) a flange projecting radially from said tube and sized to oppose an axial end of said jacket when said tube is inserted within said end of said cable;

(b) a housing having internal surfaces defining a chamber and an entrance opening exposing said chamber, said chamber and said entrance opening sized for said crimp sleeve to be inserted through said entrance opening and into said chamber with said internal surfaces opposing said flange and said end of said cable; and (c) said opening further sized for said housing at said entrance opening to urge opposing ones of said yarn fibers to fold over onto said jacket upon insertion of said crimp sleeve and said cable into said chamber.

2. A crimp according to claim 1 wherein said flange, has a radial dimension approximate to a thickness of said jacket.

3. A crimp according to claim 1 wherein said housing includes a stop for limiting insertion of said crimp sleeve into said chamber.

4. A crimp according to claim 1 wherein said housing in a region thereof opposing said inserted crimp sleeve is deformable in response to a crimping force.

5. A crimp according to claim 4 wherein said sleeve is rigid and substantially non-deformable in response to said crimping force.

6. A crimp according to claim 4 wherein said flange includes a sharp edge at a radially outer end of said flange, said housing in said region deformable over said edge in response to said crimping force.

7. A crimp according to claim 1 wherein said tube is provided with an outer surface having a plurality of raised areas on said surface.

8. A method for crimping a fiber optic cable onto a fiber optic connector having a housing including an entrance opening, and where said cable includes an axially extending optical fiber, a layer of reinforcement yarn fibers surrounding said optical fiber and a jacket surrounding said layer of yarn fibers, said method comprising:

stripping a portion of said jacket from an end of said cable to expose a length of said optical fiber and covered by an exposed length of said layer at said end;

inserting a crimp sleeve having at least an insertion tube by inserting said tube into said end with said optical fiber passing through said tube and with said tube positioned between said optical fiber and said layer of reinforcement yarn fibers;

flaring said exposed length of said layer of yarn fibers radially outwardly to expose an uncovered length of said optical fiber at said end;

said crimp sleeve includes a flange, said flaring of said yarn fibers including said insertion of said crimp sleeve until said flange urges said yarn fibers to flare radially outwardly;

inserting said end of said cable into said housing through said entrance opening while folding said flared length of said layer rearwardly onto said jacket with said folded length at least partially inserted into said housing; and crimping said housing onto said end inserted within said housing.

9. A method according to claim 8 wherein said folding of said flared length includes urging said flared length against an edge of said housing defining said entrance opening while inserting said end into said housing.

* * * * *